United States Patent [19]

Sangu

[11] Patent Number: 5,369,716

[45] Date of Patent: Nov. 29, 1994

[54] DOCUMENT READER AND READING PROCESSING METHOD THEREFOR

[75] Inventor: Akio Sangu, Tokyo, Japan

[73] Assignee: Kabushiki Kaisha Toshiba, Kawasaki, Japan

[21] Appl. No.: 123,694

[22] Filed: Sep. 20, 1993

Related U.S. Application Data

[63] Continuation of Ser. No. 922,005, Aug. 4, 1992, abandoned, which is a continuation of Ser. No. 574,813, Aug. 30, 1990, abandoned.

[30] Foreign Application Priority Data

Aug. 31, 1989 [JP] Japan .................. 1-225417

[51] Int. Cl.$^5$ .................. G06K 9/20; G06K 9/03
[52] U.S. Cl. .................. 382/61; 380/48; 380/57
[58] Field of Search .................. 382/2, 22, 24, 48, 57, 382/61, 59; 395/145–149; 345/156, 163, 173, 179, 180; G06K 9/00, 9/48, 9/46, 9/03, 9/20, 9/22; G06F 15/00; G09G 3/02

[56] References Cited

U.S. PATENT DOCUMENTS

| | | | |
|---|---|---|---|
| 4,901,063 | 2/1990 | Kimura et al. | 382/57 |
| 4,907,283 | 3/1990 | Tanaka et al. | 382/57 |
| 4,907,285 | 3/1990 | Nakano et al. | 382/61 |
| 4,933,979 | 6/1990 | Suzuki et al. | 382/61 |
| 4,933,984 | 6/1990 | Nakano et al. | 382/48 |
| 4,985,863 | 1/1991 | Fujisawa et al. | 382/57 |

FOREIGN PATENT DOCUMENTS

| | | | |
|---|---|---|---|
| 0113086 | 11/1984 | European Pat. Off. | G06K 9/34 |
| 1183784 | 7/1989 | Japan. | |

OTHER PUBLICATIONS

1986 Proc. Fall Joint Computer Conf.; Nov. 2, 1986; Dallas, Tex.; pp. 87–96; S. N. Srihari; "Document Image Understanding".

IBM Technical Disclosure Bulletin; vol. 9; No. 1; Jun. 1966; pp. 58–61; D. E. Dohler & R. J. Fritz; "Selective Field Reading for Optical Character Reader".

*Primary Examiner*—Jose L. Couso
*Attorney, Agent, or Firm*—Oblon, Spivak, McClelland, Maier & Neustadt

[57] ABSTRACT

A document reader having a scanner. The layout of the image data read by the scanner from a document is analyzed. In accordance with the analysis of the lay out, the image data is divided into blocks, and the sequence in which to read characters from these blocks is determined. A keyboard or a mouse is operated, whenever necessary, thereby deleting any block and changing the sequence of reading characters from the blocks. Characters are read from the document in the sequence changed.

28 Claims, 6 Drawing Sheets

DOCUMENT READER AND READING PROCESSING METHOD THEREFOR

This application is a continuation of application Ser. No. 07/922,005, filed on Aug. 4, 1992, which was a continuation of application Ser. No. 07/574,813, filed on Aug. 30, 1990, both now abandoned.

BACKGROUND OF THE INVENTION

1. Field of the Invention

This invention relates to a document reader and a reading processing method therefor to read characters of general documents in English, for example.

2. Description of the Related Art

For the document reader including optical character readers, the position of the character entry area on the document sheet to be read and the processing sequence (reading sequence) for each character entry area are generally determined before reading is executed, like a slip form. These pieces of data used for reading are given to a character reader as format control data (FC). FC data is given by the description showing control contents, which is translated into the format suitable for the recognition equipment to execute recognition processing and used as processing control data. As mentioned above, the document reader to execute processing according to FC data is called the slip reading type because the character entry area and line position on the sheet and the type of characters to be read are specified.

However, unlike the slip-reading-type document reader, an equipment has been developed which is given no reading control data such as FC data, and which executes reading by detecting the character reading area in which characters are recorded and determines the reading sequence. This type of document reader is called the document reading type because it purposes to read general document specifying no reading-area position or line position. For this document-reading-type document reader, it is necessary to accurately detect the character reading area for processing to determine the sequence of reading (reading sequence) for each sheet in order to execute processing for documents consisting of various type of formats.

However, character reading areas not subjected to processing are detected or incorrect reading sequences have been determined at times since documents consisting of various types of formats are read. After the read operation is executed in the above manner, edition should be executed on read results (display of character strings) displayed after the read operation. The edition includes deletion of character strings or change of positions using, for example, a word processor. This results in increase of workload. Therefore, to decrease the workload after character reading, the function has been requested to correct and change the character reading area and reading sequence determined by the equipment.

SUMMARY OF THE INVENTION

An object of the present invention is to offer the document reader and a reading processing method therefor capable of easily correcting and changing target character reading areas and reading sequences.

According to a first aspect of the present invention, a document reader comprises: means for reading a document image recorded in recording paper; means for analyzing a layout based on the read image; means for dividing the read document image into at least one block according to the analyzed layout; means for setting sequence of character reading operation for the divided blocks; means for changing the set sequence of the character reading operation; and means for performing the reading operation of the documents included in each block in accordance with the changed processing sequence.

According to a second aspect of the present invention, a document reader comprises: means for reading a document image recorded in recording paper, means for analyzing a layout based on the read image; means for dividing the read image into at least one block based on the analyzed layout; means for designating processing sequence of reading operation for the divided blocks; means for arbitrarily designating the divided blocks; means for selecting a first mode in which the designated sequence of the character reading operation is changed and a second mode in which the designated processing sequence is canceled and the processing sequence is arbitrarily set; means for changing the character reading sequence when the first mode is selected by said mode selecting means; means for setting a processing sequence corresponding to blocks in the order set by said setting means when the second mode is selected, and means for performing character reading operation of the documents included in the blocks in accordance with the processing sequence set by said changing means or setting means.

According to a third aspect of the invention, a reading method of the document reader provided with a scanner for reading images of the document recorded in recording paper, a display unit for displaying the read images, and a control section for analyzing a layout based on the read images, dividing the read document images into at least one block, and setting processing sequence of character reading operation for each divided block; said method comprises the steps of: (a) displaying the layout on said display unit, (b) changing the character reading sequence set by said control section, and (c) performing the character reading operation of the documents included in the divided blocks in accordance with the changed processing sequence.

According to a fourth aspect of the present invention, a document reader comprises: means for reading an image of a document recorded in recording paper; means for analyzing a layout based on the read image; means for dividing the read image into at least one block on the analyzed layout; means for displaying each of the divided blocks, and means for inputting data to set character reading sequence for the divided blocks.

According to the present invention, the reading sequence (processing sequence) of character reading areas (blocks) can be set, in advance to the reading operation, according the sequence required for character reading results. For this reason, editorial operation succeeding to the character reading operation can be reduced.

Furthermore, in correction, change, or selection mode, the selection of blocks subjected to the read operation and its processing sequence (reading sequence) can arbitrarily be determined. For this reason, the character reading results of the necessary blocks can be obtained in the desired order. Thus, the editorial operation such as deletion of character strings and modification of positions using a word processor can be reduced. Moreover, correction and change can effectively be executed by using the correction and the change mode when a few portions of read results are corrected and changed and by using the select mode when many portions are corrected and changed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 3 through 6 show display examples of the display unit for explaining the processing of an embodiment of the present invention, in which FIG. 3 is a display example of image data and character data read by a scanner and then reduced;

FIG. 4 is for explaining processing for correction/change mode;

FIG. 5 is a view illustrating an initial screen in a selection mode; and

FIG. 6 illustrates a screen when the first block reading sequence is designated.

DETAILED DESCRIPTION OF THE PREFERRED EMBODIMENT

Figure 1:
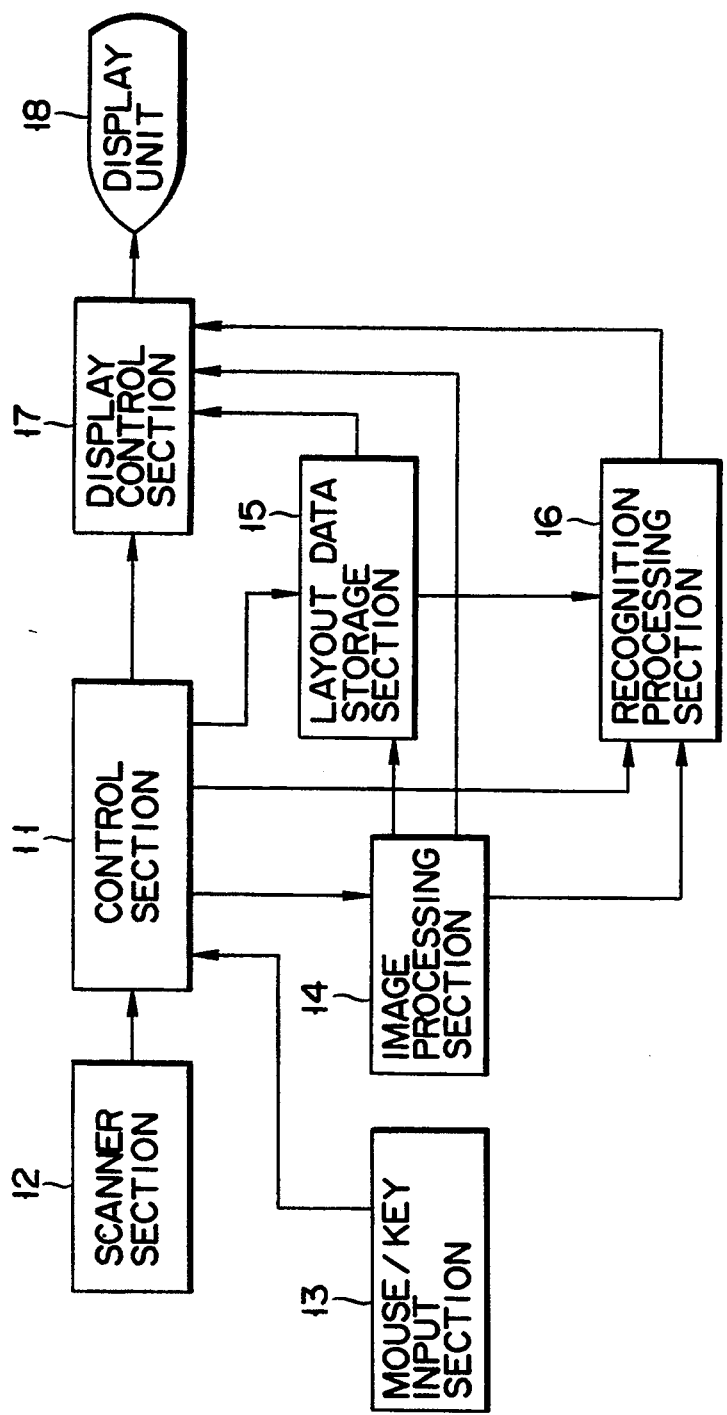
FIG. 1 is a block diagram showing an arrangement of an embodiment of a document reader of the present invention.

FIG. 1 is a block diagram showing an embodiment of a document reader according to the present invention.

In FIG. 1, a control section 11 controls an entire of the document reader. A scanner section 12 optically scans a document and transfers image data including character patterns to the control section 11. The mouse/key input section 13 serves as a part of a man-machine interface, and is used to input instructions to control processings. An image processing section 14 analyzes the image data detected by the scanner section 12, detects character areas (blocks) to be read and determines the positions of each block and the order of the respective blocks subjected to the character reading operation (reading order) under the control of the control section 11. The layout data storage section 15 stores position (layout) data of each block analyzed by the image processing section 14 and data indicating the reading sequence after completing the processing (correction or change) corresponding to the instruction input from the mouse/key input section 13. A recognition processing section 16 performs the character reading operation based on the data sent from the image processing section 14 and the layout data storage section 15. A display control section 17 controls to display characters, images, and diagrams according to the data sent from the image processing section 14, the layout data storage section 15, and the recognition processing section 16. A display unit 18 displays characters, images, and diagrams under the control of the display control section 17.

Figure 2:
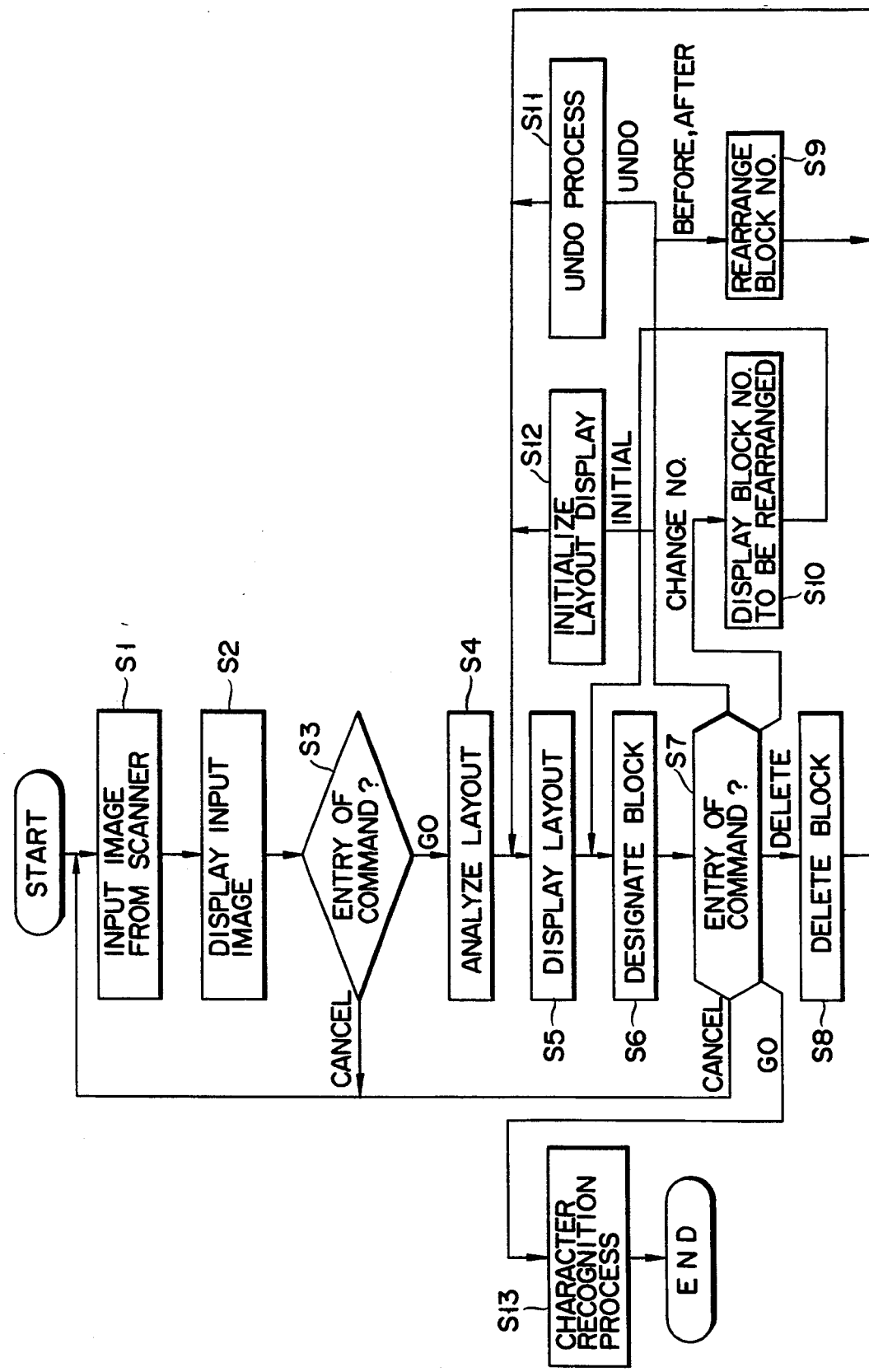
FIG. 2 is a flowchart showing the operation of the embodiment in FIG. 1.

The processing operations such as correction and change for the blocks subjected to the character reading operation and the reading sequence will now be described while referring to the flowchart of FIG. 2.

The scanner section 12, in step S1, optically scans while conveying a sheet, detects image data recorded the sheet and output the image data to the control section 11. Upon detecting image data of one sheet, the control section 11, in step S2, designates the display control section 17 to display the input image and command boxes to designate the input image and processing contents for the input images based on the image data from the scanner section 12. The display control section 17 displays the screen such as shown in FIG. 3 on the display unit 18 in response to the command from the control section 11.

Figure 3:
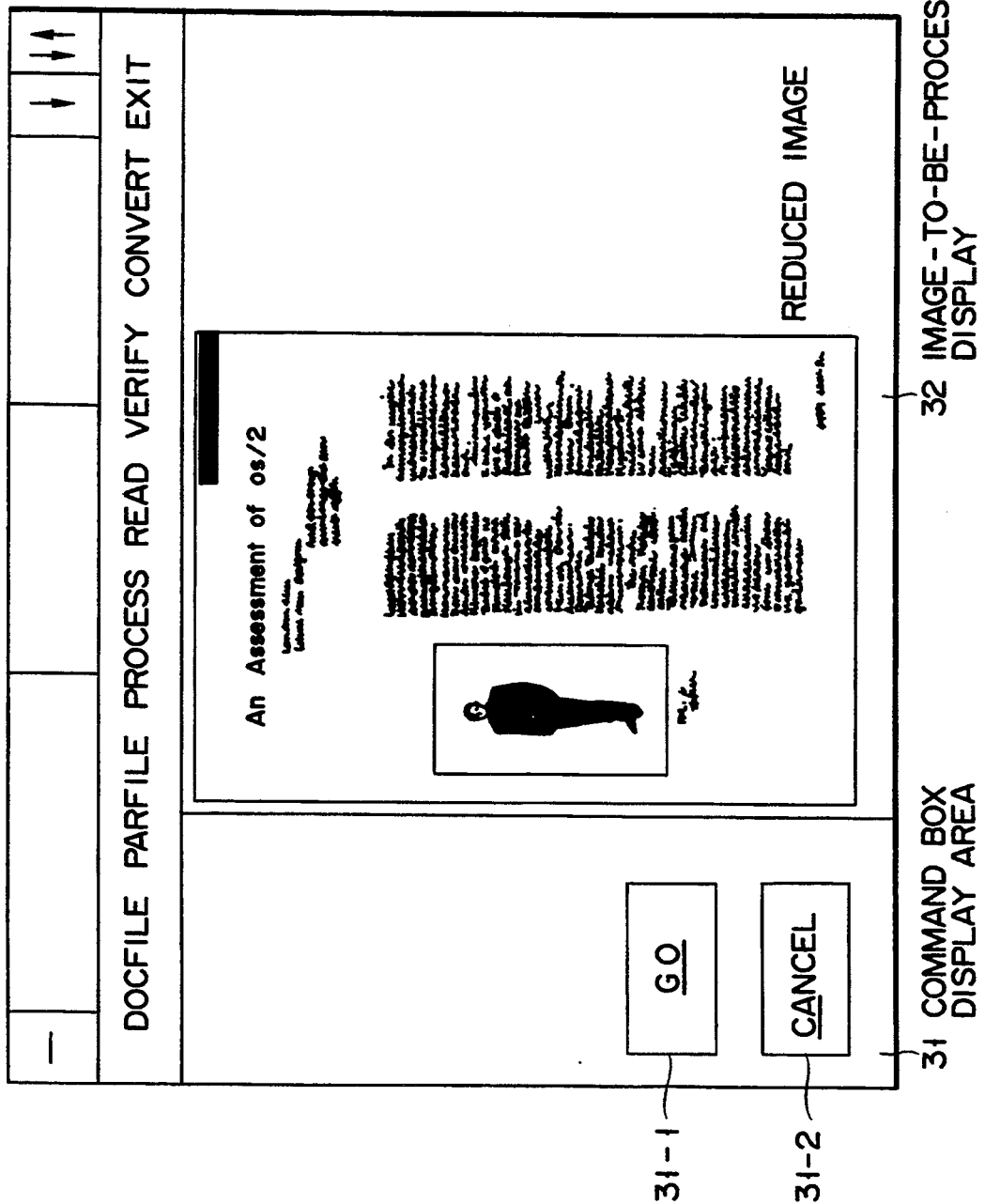

As shown in FIG. 3, the display unit 18 is provided with the command box display area 31 to display command boxes and the processed-image display area 32 to display input images. In this embodiment, the command box "GO" 31-1 to designate start of character reading and the command box "Cancel" 31-2 to designate stop of the processing are displayed in the command box display area 31. Also, a reduced image adapted to the size of the display area is displayed in the processed-image display area 32. This displayed image is the one input by the scanner section 12, and without any modification. Accordingly, photos and illustrations recorded in the sheet to be processed are also directly displayed. In this case, the image data and character data read by the scanner section 12 are directly reduced. Therefore, the reduced image data and character data cannot always be recognized by an operator. However, there is no problem from a view point of knowing the overall layout.

After an input image is displayed, control section 11 waits for the command to designate the character reading operation or the command designating cancellation of the processing. (Step S3)

In response to the command box "Central" E31-2 being clicked by, for example, the mouse of the mouse/key input section 13, the control section 11, in the step S4, commands the image processing section 14 to analyze the layout of the document based on input image data. In the layout analysis, a group of character strings in the document is detected as a block (displayed by a rectangle). The image processing section 14 obtains the coordinate positions (indicated, for example, by two points at the corners diagonally located (start and end points)) of each block obtained through the layout analysis and determines the reading sequence for each block in accordance with a predetermined rules (for example, "read an English original from left to right or from top to bottom" or "do not read the caption attached to an illustration" (that is, "do not read image data which cannot be expressed as code data since the present invention relates to the document reader")). For example, how to detect each block is described in the U.S. Ser. No. 07/298986. The image processing section 14 stores the block start point (xstr, ystr), block end point (xend, yend), and a group of block numbers (block-No.) indicating the reading sequence, in the layout data storage section 15 for each block as layout data. When layout data for all blocks is stored in the layout data storage section 15, the control section 11 commands the display control section 17 to display the block layout in document and the reading sequence determined for each block. The display control section 17 displays the layout on the display unit 18 according to the layout data stored in the layout data storage section 15. (Step S5)

Figure 4:
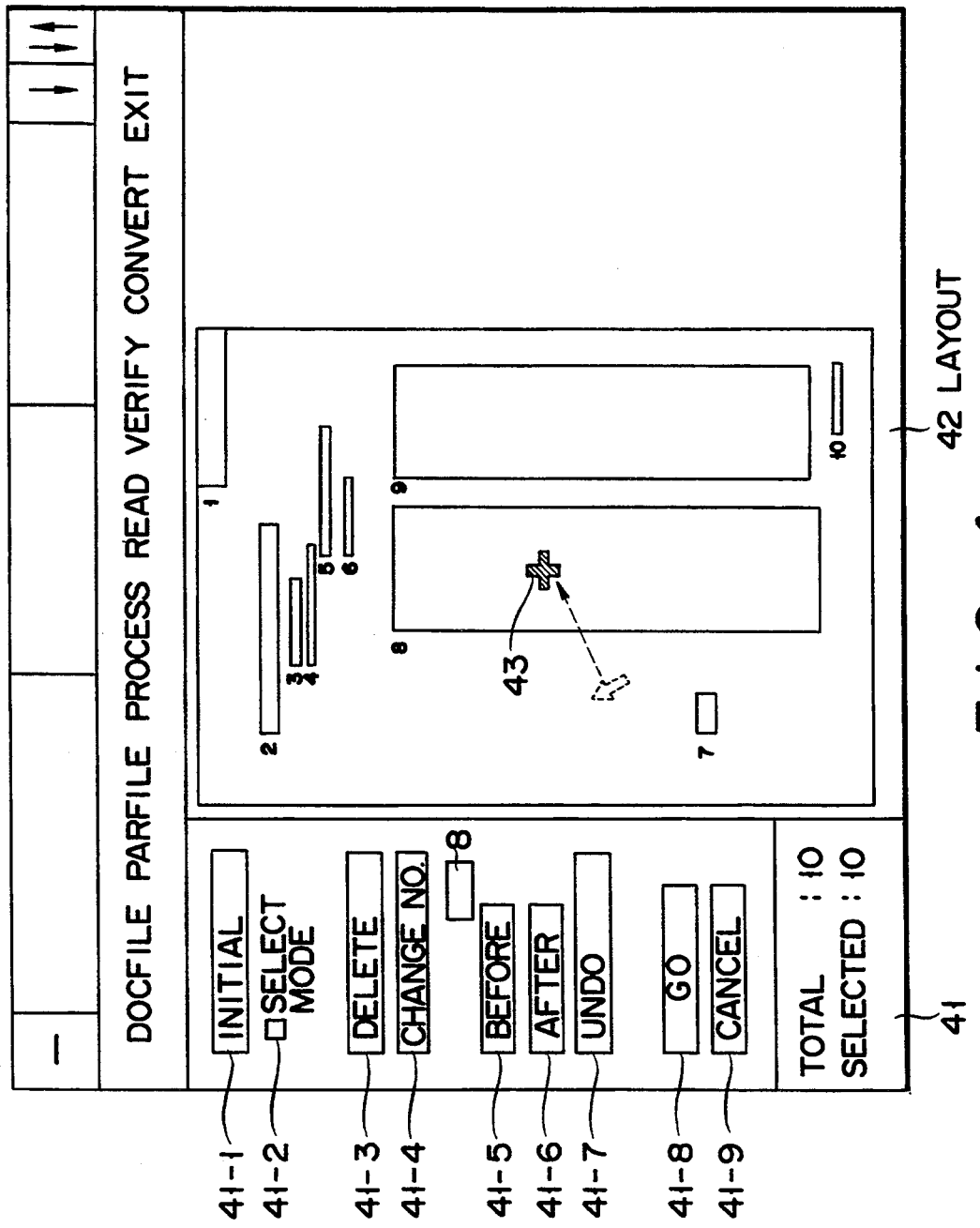

FIG. 4 shows the example of the displayed layout. As shown in FIG. 4, the display unit 18 is provided with the command box display area 41 to display the command boxes for correction and change of the reading sequence and the layout display area 42 to display the block layout. In this embodiment, command boxes from 41-1 through 41-9 to be described later and the number of blocks "SELECTED" detected through the analysis by the image processing section 14 are displayed in the command box display area 41. It is assumed that 10 blocks are set in this embodiment. The number of blocks for character reading reaches 10 before correction or change is made. The block layout indicated by a rectangular frame and the figure indicating the reading sequence determined for each block are displayed in the layout display area 42. In the layout display, only the blocks subjected to the character reading are displayed but positions of images such as photos and illustrations are not displayed.

After the block layout is displayed, the state is ready for input of the command to correct and change the blocks for character reading. If any command box is clicked by the mouse/key input section 13 among the command boxes 41-1 through 41-9 displayed in the command box display area 41, the processing corresponding to the clicked command box is executed.

Normally, "CORRECT" or "CHANGE" mode is set to execute correction or change according to the data for reading sequence determined by the image processing section 14. When "SELECT" mode 41-2 is selected, "SELECT" mode is set which allows the operator to optionally select a block to be processed and reading sequence. "CORRECT" and "CHANGE" modes are used when there are only a few blocks to be changed while "CHANGE" mode is used when there are many blocks to be changed.

The correct and change operations using commands in "CORRECT" and "CHANGE" modes will now be described.

i) To delete the blocks subjected to the character reading processing "DELETE" 41-3 is used. In this case, the cursor position is moved according to the designation data input from the mouse/key input section 13. When the cursor 43 enters into a block, the control section 11 changes the indication from an arrow mark to a cross mark as shown in FIG. 4. Then, the cursor is moved to the command box "DELETE" 41-3 and clicked. Then, the data for block number (block-No.) showing the reading sequence stored in the layout data storage section 15 is changed. More specifically, the "block-No." of the designated block is cleared and the block number of the block whose reading sequence alters is changed. For example, if the block No. 8 is deleted, the block No. 9 and block No. 10 are changed to the block No. 8 and the block No. 9, respectively. Then, the control section 11 commands the display control section 17 to display the changed layout. The display control section 17 displays the layout according to the changed layout data. (Step S5) In this case, the block to be deleted is displayed by, for example, a broken-line frame. Also, the number of blocks for character reading is specified as 9 and data for "SELECTED" is changed to "9".

ii) To change block reading sequence, "CHANGE NO." 1-4, "BEFORE" 41-5, and "AFTER" 41-6 are used.

In this case, the block to be changed (e.g. block No. 8) is designated according to the instruction data input from the mouse/key input section 13. (Step S6) Then, if the command box "CHANGE NO." 41-4 is clicked (Step S7), the control section 11 displays "8" in the command box display area 41 as shown in FIG. 4. (Step S10) Then, the instruction is input to determine whether the reading sequence of the block No. 8 is set before or after which block No. If the block No. 10 is designated, for example, it is highlighted on the display screen. That is, the designated block is colored or shaded. Then, the command box "BEFORE" 41-4 or "AFTER" 41-5 is clicked. If the command box "After" 41-5 is clicked, for example, the control section 11 changes the reading sequence of the block Nos. 9 and 10 stored the layout data storage section 15 to "8" and "9", respectively and that of the block No. 8 to "10". (Step S9) The control section 11 commands the display control section 17 to display the changed layout. The display control section 17 changes the figure indicating the reading sequence according to change of the reading sequence, and display the layout. (Step S5)

iii) To cancel a processing corresponding to a command, "UNDO" 41-7 is used. The command "UNDO" stops the processing used for "DELETE" 41-3 and "CHANGE" 41-4 previously mentioned. That is, if the block to be processed is set before the command box "UNDO" 41-7 is clicked to execute correction and change of block (Step S7), block setting is canceled (UNDO processing, Step S11) to display the layout. (Step S5).

iv) To initialize the block layout display, "INITIAL" 41-1 is used.

That is, the corrected or changed contents are deleted by the processing using "DELETE" 41-3 or "CHANGE No." 41-4 previously mentioned and the layout display is initialized according to the layout data under the initialized state. In this case, If the command box "INITIAL" 41-1 is clicked (Step S7), the layout display is initialized according to the layout data under the initialized state stored in the layout data storage section 15. (Step S12) To initialize the block display, it is unnecessary to designate a block (Step S6) but a command should directly be designated.

v) To stop character reading after layout analysis, "CANCEL" 41-9 is used. If the command box "CANCEL" 1-9 is clicked, the control section 11 stops character reading and returns to the step S6 to designate input of images of another sheet. To stop character reading, it is unnecessary to designate a block but a command should directly be designated.

vi) To execute character reading after correcting or changing the block for character reading or the reading sequence, "GO" 41-8 is used.

If the command box "GO" 41-8 is clicked, the control section 11 designates the recognition processing section 16 to execute character reading. In response to the command for character reading processing, the recognition processing section 16 successively determines the block to be processed according to the data (block-No.) indicating the reading sequence stored in the layout data storage section 15 and inputs the image data of the block. For example, the recognition processing section 16 detects lines in a block and extracts the character pattern of each line. Further, the recognition processing section performs for each character pattern and generates character codes.

"SELECT" mode processing will now be described.

Figure 5:
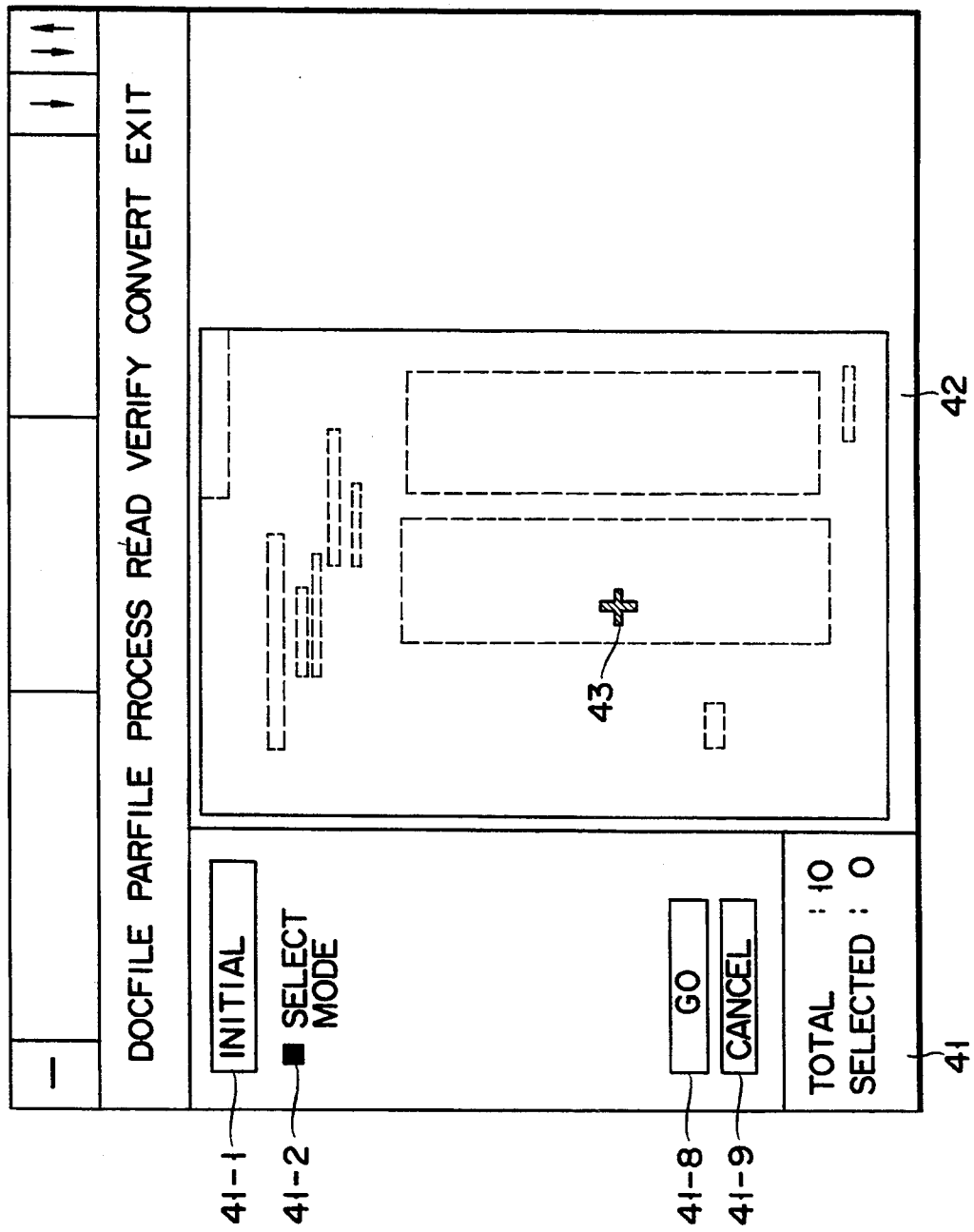
Figure 6:
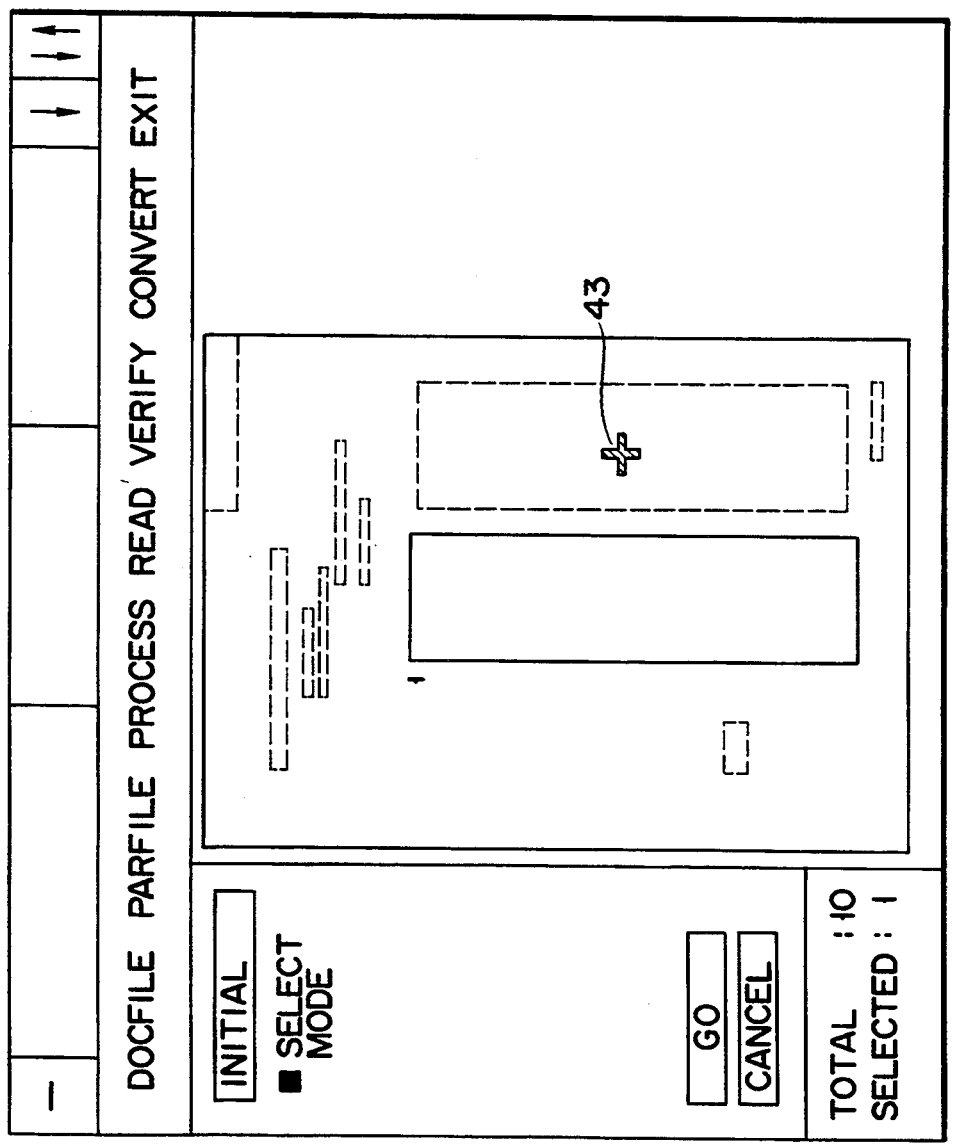

In "SELECT" mode, it is possible to determine any block for character recognition and the reading sequence according to the layout data for each block detected by the image processing section 14. When the command box "SELECT" mode 41-2 is clicked, the control section 11 sets "SELECT" mode and displays the initial screen for "SELECT" mode as shown in FIG. 5. As shown in FIG. 5, the section 11 changes the command box indication from "☐" to "■" to show "SELECT" mode. It also displays all blocks shown in the layout display area 42 with a broken-line frame and sets data corresponding to "SELECTED" to "0" to show that the number of blocks character reading is 0. In this case, to set the block subjected to the character reading, the cursor is moved to the block indicated by a broken-line frame in the order of required reading sequence and then clicked. when the data to designate a block is input from the mouse/key input section 13, the control section 11 stores the block number indicating the reading sequence corresponding to the designated block in the layout data storage section 15 in order to read characters of the designated block. Further, the control section 11 commands the display control section 17 to display the designated block with a solid line frame and the number indicating the reading sequence and sets the value for "SELECTED". Thus, selection of a block is completed. FIG. 6 shows the state immediately before selection of the next block. That is, in "SELECT" mode, it is possible to optionally set the block to be processed and the reading sequence independently of the reading sequence set by the image processing section 14.

"SELECT" mode is changed to "CORRECT" or "CHANGE" mode by clicking "■". Also in "SELECT" mode, each processing is executed by clicking the command boxes "INITIAL" 41-1, "GO" 41-8, and "CANCEL" 41-9. The processing details are the same as that of "CORRECT" of "CHANGE" mode, and thus the description thereof is omitted.

In the embodiment mentioned above, it is described that only the frame indicating the block position is displayed when displaying block layout (FIGS. 4.through 6). However, a layout drawing may be displayed overlapped with input image to be displayed. Furthermore, the block selected to be processed may displayed through display modification such as coloring, inversely displaying, or shading so that the block will more easily be recognized.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A document reading apparatus for reading document data without using format data, comprising:
   means for reading a document image recorded on a recording sheet;
   means for analyzing a layout based on the read image;
   means for dividing the read document image into plural blocks in accordance with the analyzed layout;
   means for setting a set order of character reading processing for the divided blocks;
   means for inputting data to change the set order in which said blocks are to undergo character reading processing to a changed order in which one of said blocks is processed by said character reading processing before at least one other of said blocks from the set order of the character reading processing;
   means for changing the order of the character reading processing set by said setting means in accordance with the data input by said input means; and
   means for performing the character reading processing of the portions of the document included in the respective blocks in accordance with the changed order of character reading processing.

2. The apparatus according to claim 1, further comprising means for ceasing the changing processing by said changing means.

3. The apparatus according to claim 1, further comprising display means for displaying the layout.

4. The apparatus according to claim 3, further comprising means for displaying the layout, as the necessity requires, when the changing processing by said changing means is performed.

5. The apparatus according to claim 3, wherein said display means includes means for displaying the frames of the divided blocks and the input document image, superimposed one upon the other.

6. The apparatus according to claim 3, wherein said changing means includes means for designating a block from which characters are to be read in a changed order, and said display means includes display modifying means for distinguishing the designated block from the other block.

7. The apparatus according to claim 6, wherein said display-modifying means includes means for displaying the designated block in a color.

8. The apparatus according to claim 6, wherein said display-modifying means includes means for reverse-displaying the designated block.

9. The apparatus according to claim 6, wherein said display-modifying means includes means for displaying the designated block in shade.

10. The apparatus according to claim 1, further comprising means for ceasing the character reading processing.

11. A document reading apparatus without using format data, comprising:
    means for reading a document image recorded on a recording sheet;
    means for analyzing a layout based on the read image;
    means for dividing the read document image into plural blocks in accordance with the analyzed layout;
    means for setting a set order of character reading processing for the divided blocks;
    means for selecting a first mode in which the designated order of the character reading processing is changed, or a second mode in which the designated order of the character reading processing is canceled and a new order of the character reading processing is arbitrarily set;
    means for inputting data to change the set order in which said blocks are to undergo character reading processing to a changed order in which one of said blocks is processed by said character reading processing before at least one other of said blocks from the set order of the character reading processing;
    means for changing the set character reading processing in accordance with the data input by said input means when the first mode is selected by said mode selecting means;

means for setting the character reading processing in the designated order when the second mode is selected; and means for performing the character reading processing of the portions of the document included in the respective blocks in accordance with the order of character reading processing set by said changing means or said setting means.

12. The apparatus according to claim 11, further comprising means for ceasing the changing processing by said changing means.

13. The apparatus according to claim 11, further comprising display means for displaying the layout.

14. The apparatus according to claim 13, further comprising means for displaying the layout, as the necessity requires, when the changing processing by said changing means is performed.

15. The apparatus according to claim 13, wherein said display means includes means for displaying the frames of the divided blocks and the input document image, superimposed one upon the other.

16. The apparatus according to claim 13, wherein said changing means includes means for designating a block to be changed, and said displaying means includes display-modifying means for distinguishing the designated block from the other blocks.

17. The apparatus according to claim 16, wherein said display-modifying means includes means for displaying the designated block in a color.

18. The apparatus according to claim 16, wherein said display-modifying means includes means for reverse-displaying the designated block.

19. The apparatus according to claim 16, wherein said display-modifying means includes means for displaying the designated block in shade.

20. The apparatus according to claim 11, further comprising means for ceasing the character reading processing.

21. A reading processing method for a document reader provided with a scanner for reading a document image recorded on a recording sheet without using format data, a display unit for displaying the read image, and a control section for analyzing a layout based on the read images, dividing the read document image into plural blocks, and setting a set order of character reading processing of the divided blocks, said method comprising the steps of:

(a) displaying the layout on said display unit;

(b) inputting data to change the set order in which the divided blocks are to undergo character reading processing from the set order to a changed order in which one of said blocks is processed by said character reading processing before at least one other of said blocks from the set order of the character reading processing;

(c) changing the order of the character reading processing set by said control section to said changed order; and (d) performing the character reading processings of the portions of the document image included in the respective blocks in accordance with the changed order of character signal processing.

22. The method according to claim 21, further comprising a step of ceasing the changing of the order of the character reading processing.

23. The method according to claim 21, further comprising a step of displaying the layout, as the necessity requires, when the changing processing is performed.

24. The method according to claim 21, further comprising the step of ceasing the character reading processing.

25. A document reading apparatus for reading document data without using format data, comprising:

means for reading a document image recorded on a recording sheet;

means for analyzing a layout based on the read image;

means for dividing the read document image into at least one block in accordance with the analyzed layout;

means for setting an order of character reading processing for the divided blocks;

means for inputting data for changing the order of the character reading processing, the data including data for designating a block to be excluded from the character reading processing;

means for changing the order of the character reading processing set by said setting means in accordance with the data input by said input means, including, means for excluding the block designated from the character reading processing, and means for changing the reading order of one block designated, before or after an other block designated; and means for performing the character reading processing of the document included in the respective blocks in accordance with the changed processing order.

26. A document reading apparatus without using format data, comprising:

means for reading a document image recorded on a recording sheet;

means for analyzing a layout based on the read image;

means for dividing the read document image into at least one block in accordance with the analyzed layout;

means for designating an order of character reading processing for the divided blocks;

means for arbitrarily designating the divided blocks;

means for selecting a first mode in which the designated order of the character reading processing is changed, or a second mode in which the designated order of the character reading processing is canceled and a new order of the character reading processing is arbitrarily set;

means for inputting data for changing the set order of the character reading processing, the data including data for designating a block to be excluded from the character reading processing;

means for changing the set character reading processing in accordance with the data input by said input means when the first mode is selected by said mode selecting means, including, means for excluding the block designated from the character reading processing, and means for changing the reading order of one block designated, before or after an other block designated;

means for setting the character reading processing in the designated order when the second mode is selected; and means for performing the character reading processing of the documents included in the respective blocks in accordance with the processing order set by said changing means or said setting means.

27. A reading processing method for a document reader provided with a scanner for reading a document image recorded on a recording sheet without using format data, a display unit for displaying the read image, and a control section for analyzing a layout based on the read image, dividing the read document image into at least one block, and setting an order of character reading processings of the divided blocks, said method comprising the steps of:
   (a) displaying the layout on said display unit;
   (b) inputting data for changing the order of the character reading processings, the data including data for designating a block to be excluded from the character reading processing;
   (c) changing the order of the character reading processings set by said control section including excluding the block designated from the character reading processing; and
   (d) performing the character reading processings of the documents included in the respective blocks in accordance with the changed processing order.

28. A document reading apparatus for reading document data without using format data, comprising:
   means for reading a document image recorded on a recording sheet;
   means for analyzing a layout based on the read image;
   means for automatically dividing the document image into a plurality of blocks in accordance with the layout;
   means for automatically creating a first set order of the divided blocks;
   means for displaying a copy of the image including displaying the first set order to an operator;
   means for changing the first set order of the divided blocks to a second set order by manipulation o the display by the operator; and
   character reading processing means commenced by the operator for processing each divided block in the second set order according to the means for manually changing the first set order,
   wherein a plurality of images are processed by the character reading processing means and the reset order of processing of the blocks for each of said plurality of images is determined by the operator.

* * * * *